United States Patent
Barton et al.

(10) Patent No.: US 10,241,985 B2
(45) Date of Patent: Mar. 26, 2019

(54) SYSTEMS AND METHODS FOR INTELLIGENT DOCUMENT-CENTRIC ORCHESTRATION THROUGH INFORMATION EXCHANGE PLATFORM

(71) Applicant: Open Text GXS ULC, Halifax (CA)

(72) Inventors: Jeffrey Wayne Barton, Myersville, MD (US); John Theodore Radko, Germantown, MD (US); Waqas Ahmed, Clarksburg, MD (US)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 15/651,761

(22) Filed: Jul. 17, 2017

(65) Prior Publication Data

US 2018/0039607 A1  Feb. 8, 2018

Related U.S. Application Data

(60) Provisional application No. 62/369,953, filed on Aug. 2, 2016.

(51) Int. Cl.
*G06F 17/22* (2006.01)
*G06Q 10/10* (2012.01)

(52) U.S. Cl.
CPC ........ *G06F 17/227* (2013.01); *G06F 17/2247* (2013.01); *G06F 17/2282* (2013.01); *G06Q 10/10* (2013.01); *G06Q 10/107* (2013.01)

(58) Field of Classification Search
CPC . G06F 17/227; G06F 17/2247; G06F 17/2282
USPC ................. 715/234, 235, 236, 239
See application file for complete search history.

(56) References Cited

U.S. PATENT DOCUMENTS

| | | | | |
|---|---|---|---|---|
| 6,119,137 A * | 9/2000 | Smith | ................ | G06F 17/3089 707/E17.116 |
| 8,887,230 B2 * | 11/2014 | Barton | ................ | H04L 41/046 726/1 |
| 9,613,190 B2 * | 4/2017 | Ford | ................ | G06F 21/10 |
| 9,769,174 B2 * | 9/2017 | Rieke | ................ | H04L 63/101 |
| 2004/0073613 A1 * | 4/2004 | Plewnia | ............ | H04N 1/32128 709/206 |
| 2007/0043864 A1 * | 2/2007 | Nemoto | ............. | G06F 21/6209 709/225 |

(Continued)

OTHER PUBLICATIONS

FlowPort User Guide; 2000; Xerox Corporation; 148 Pages.*

*Primary Examiner* — Andrew R Dyer
(74) *Attorney, Agent, or Firm* — Sprinkle IP Law Group

(57) ABSTRACT

An intelligent and versatile information exchange platform provides a delivery service operable to perform, in a network environment, processing a document in a first process context according to a first itinerary associated with a sender, including determining whether any receiver policy rule is applicable to the document. If so, the delivery service can determine a second itinerary in view of the receiver policy rule and automatically transition to act as a receive service for the receiver such that the document is processed is a second process context according to the second itinerary associated with the receiver. When no receiver policy rule is found or applicable to the document based on the document type of the document, the delivery service can deliver the document to the receiver under the first process context.

17 Claims, 8 Drawing Sheets

(56) References Cited

U.S. PATENT DOCUMENTS

| | | | | |
|---|---|---|---|---|
| 2008/0123124 A1* | 5/2008 | Smithson | ............... | G06F 21/57 358/1.13 |
| 2009/0164781 A1* | 6/2009 | Bouchard | ........... | H04L 63/0428 713/165 |
| 2011/0321154 A1* | 12/2011 | Dau | .................... | G06F 21/6218 726/17 |
| 2013/0325870 A1* | 12/2013 | Rouse | ............... | G06F 17/30707 707/741 |
| 2015/0310188 A1* | 10/2015 | Ford | ....................... | G06F 21/10 726/28 |
| 2016/0308958 A1* | 10/2016 | Navali | ............. | H04N 21/23439 |
| 2017/0033987 A1* | 2/2017 | Bush | ....................... | G06Q 10/10 |
| 2017/0124515 A1 | 5/2017 | Ceppi et al. | | |

* cited by examiner

SYSTEMS AND METHODS FOR INTELLIGENT DOCUMENT-CENTRIC ORCHESTRATION THROUGH INFORMATION EXCHANGE PLATFORM

CROSS-REFERENCE TO RELATED APPLICATION(S)

This application is a conversion of, and claims a benefit of priority from U.S. Provisional Application No. 62/369,953, filed Aug. 2, 2016, entitled "SYSTEMS AND METHODS FOR INTELLIGENT DOCUMENT-CENTRIC ORCHESTRATION THROUGH INFORMATION EXCHANGE PLATFORM," which is fully incorporated by reference herein for all purposes.

TECHNICAL FIELD

This disclosure relates generally to data processing in a network computing environment. More particularly, this disclosure relates to systems and methods for intelligent document-centric orchestration through an information exchange platform.

BACKGROUND OF THE RELATED ART

Today, enterprises and entities alike recognize the tremendous cost savings by exchanging business documents with their trading partners via an electronic communication method referred to as the Electronic Data Interchange (EDI). However, diverse trading partner capabilities and their disparate and complicated systems present challenges to those considering using EDI.

SUMMARY OF THE DISCLOSURE

An object of the invention is to overcome these challenges and remove obstacles in exchanging information electronically, over disparate networked computer systems. According to embodiments, this object is achieved in an information exchange platform referred to as a Trading Grid or TG. The OpenText GXS TRADING GRID® represents an example of such a Trading Grid or TG.

A Trading Grid operates in a network environment and has the necessary resources (e.g., hardware, software, personnel, etc.) to provide managed services that enable the real-time flow or exchange of information electronically in the network environment in a secure, fast, and reliable manner, between and among disparate operating units. In this disclosure, an operating unit (OU) represents a company, a corporation, an enterprise, an entity, or a division thereof. An example of a network environment may include a distributed computer network, a cloud computing environment, or the Internet. Non-limiting examples of managed services may include translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc.

A Trading Grid operates to facilitate the real-time flow or exchange of information between disparate entities regardless of standards preferences, spoken languages, or geographic locations. A Trading Grid may be embodied on server machines that support the electronic communication method (e.g., EDI) used by various computers that are independently owned and operated by different entities. In some embodiments, supported data formats may include EDI, Extensible Markup Language (XML), ROSETTA-NET®, EDI-INT, flat file/proprietary format, etc. Supported network connectivity may include dial-up, frame relay, AS2, leased line, Internet, etc. Supported delivery methods may include store-and-forward mailbox, event-drive delivery, etc. Supported transport methods may include Hypertext Transfer Protocol (HTTP), File Transfer Protocol (FTP), and Simple Mail Transfer Protocol (SMTP), etc. Supported network security protocols may include Secure Socket Layer (SSL), Secure/Multipurpose Internet Mail Extensions (S/MIME), Internet Protocol Security (IPSEC), Virtual Private Network (VPN), Pretty Good Privacy (PGP) encryption protocol, etc.

Embodiments disclosed herein are directed to systems and methods for document-centric orchestration through an information exchange platform (e.g., a Trading Grid). As disclosed herein, the information exchange platform can include at least one server machine operating in a network environment. In some embodiments, a method for document-centric orchestration through an information exchange platform may include processing a document in a first process context according to a first itinerary associated with a sender. According to embodiments disclosed herein, an itinerary comprises an XML document that describes a processing model specific to the document type.

The first process context may have a first correlation identifier and a process identifier. The first itinerary may represent a first data flow having a first entitlement boundary associated with the sender. In some embodiments, the processing can be performed by an intelligent control logic (referred to herein as a delivery service) of the information exchange platform.

The document, which is received by a gateway component communicatively connected to the information exchange platform from a sender computer for delivery to a receiver computer, can have a sender-receiver document type. The information exchange platform is structured to operate on data flow tuples. Each data flow tuple may represent a sender, a receiver, and a document type of their relationship (e.g., an invoice sent from a seller to a buyer, a purchase order from a buyer to a seller, etc.). Senders and receivers may be entities that utilize services provided by the information exchange platform to communicate with one another. Thus, their computers operate in computing environments that are external to the network environment where the information exchange platform operates.

In some embodiments, the processing according to the first itinerary associated with the sender may include evaluating a document type of the document to determine a policy rule set associated with the sender; applying the policy rule set associated with the sender; translating the document from a sender format to a canonical representation; and marking the first data flow as complete with respect to delivery of the document.

According to embodiments, the delivery service of the information exchange platform can further determine, based on the document type of the document, whether any receiver policy rule owned by a receiver is applicable to the document. If so, the delivery service of the information exchange platform may determine that crossing an entitlement boundary is necessary to process the document for the receiver and can automatically transition to (and acting on) a different role and continue to process the document, for instance, as a receive service for the receiver.

In this way, a document is orchestrated from one itinerary to another, even though these itineraries are owned by and configured for different entities (i.e., different entitlements). Taking a document-centric approach document processing according to embodiments disclosed herein can cross this entitlement boundary and intelligently join these itineraries, providing visibility and visualization over the entire lifecycle of a document transaction—from when that document is received at the information exchange platform from a sender to when that document is received by the information exchange platform on behalf of a receiver and processed into a language or format specific to the receiver's domain (e.g., for transmission to the receiver's private network).

In some embodiments, subsequent to transitioning to a different role, the delivery service acts as a receive service for the receiver and operates to determine a second itinerary in view of the at least one receiver policy rule, the second itinerary representing a second data flow having a second entitlement boundary associated with the receiver. The receive service (which is the same intelligent control logic that performed the delivery service that processed the first itinerary) may set up a boundary parent identifier to link the first itinerary associated with the sender and the second itinerary associated with the receiver, establish a linkage with the second itinerary, and proceed to process the canonical representation from the first data flow as an input to the second itinerary in a second process context according to the second itinerary associated with the receiver. The second process context may have a second correlation identifier and the process identifier.

Each time a document is received (e.g., from the sender computer or the first data flow in the example above) a new context with a new correlation identifier is created. This correlation identifier does not extend beyond the entitlement boundary. For instance, when the document is received from the sender computer (e.g., at a gateway server), the first process context is created. Processes instantiated for the first itinerary all have the same correlation identifier associated with the sender. Likewise, processes instantiated for the second itinerary all have the same correlation identifier associated with the receiver. The receive operation is complete when the canonical representation is translated into a receiver format according to the second itinerary associated with the receiver.

In some embodiments, the first data flow may represent a process tree where each child process of the process tree has the first correlation identifier, the process identifier, and a boundary parent process identifier. Unlike the first correlation identifier, the boundary parent process identifier can extend beyond the first entitlement boundary associated with the sender.

According to embodiments disclosed herein, when at least one receiver policy rule is applicable to the document based on the document type of the document, delivery of a document represents an entitlement change (e.g., from a sender to a receiver). In some embodiments, the delivery operation (in stages defined by the first itinerary) as well as the receive operation (in stages defined by the second itinerary) can be documented via metadata stored in a metadata repository (MDR). In some embodiments, when no receiver policy rule is found or applicable to the document based on the document type of the document, the delivery service of the information exchange platform can deliver the document to the receiver without causing entitlement change. This is because, in this scenario, the delivery can be made under the original process context.

In one embodiment, a system may comprise at least one processor, at least one non-transitory computer-readable storage medium, and stored instructions translatable by the at least one processor to implement an intelligent document-centric orchestration control logic or delivery service substantially as described herein. Another embodiment comprises a computer program product having at least one non-transitory computer-readable storage medium storing instructions translatable by at least one processor to perform a method substantially as described herein. Numerous other embodiments are also possible.

Embodiments disclosed herein can provide many advantages. For example, different itineraries owned by different entities can be automatically joined to thereby form an efficient, high performance, document-centric global data flow, while respecting the entitlement boundaries of these different entities. Furthermore, visibility and visualization of the entire lifecycle of a document transaction is now possible and can be made available (with the appropriate entitlement rights), even though processing of the document was actually done according to different itineraries owned by and configured for different entities.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
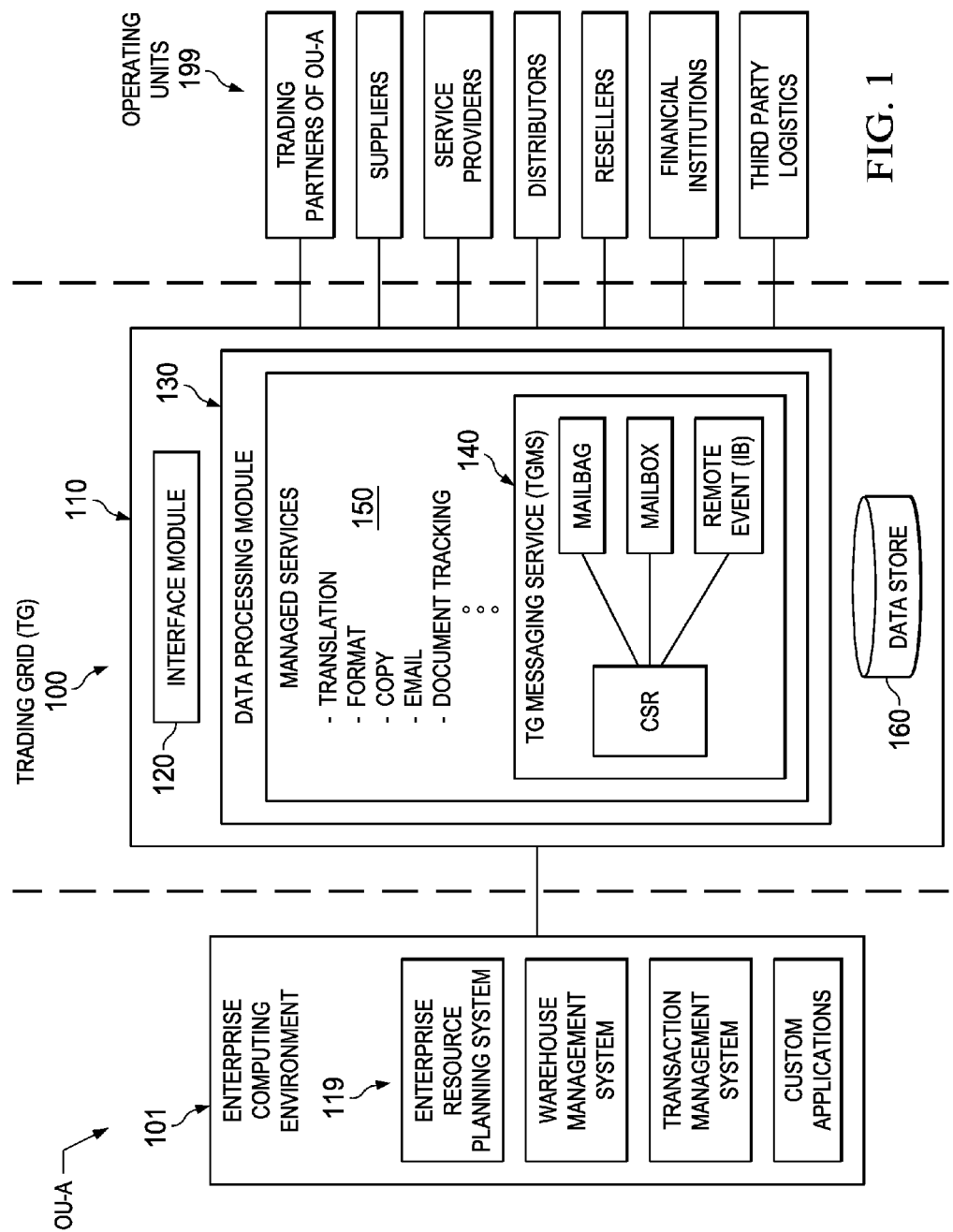
FIG. 1 depicts a diagrammatic representation of an information exchange platform operating in a computer network environment, the information exchange platform having an intelligent document-centric orchestration control logic that can act as both a delivery service for one operating unit and a receive service for another operating unit communicatively connected to the information exchange platform according to some embodiments.

FIG. 1 depicts a diagrammatic representation of an example information exchange platform, referred to as Trading Grid 100, operating in a computer network environment. In the example shown in FIG. 1, a system 110 operating on Trading Grid 100 may comprise a plurality of modules, including interface module 120, data processing module 130, and data store 160. In some embodiments, data processing module 130 may be configured for providing and managing a very large number (e.g., 50 or more) of services 150 performed by backend systems operating on Trading Grid 100. Interface module 120 may be configured for providing user interfaces for registered operating units (OUs) such as OU-A with access to managed services 150.

As an example, OU-A may own and operate enterprise computing environment 101 which is separate and independent of Trading Grid 100. From the perspective of Trading Grid 100 or system 110, OU-A is a registered enterprise customer and, thus, systems 119 of OU-A which utilize services 150 provided by system 110 are client systems of system 110. Client systems 119 operating in enterprise computing environment 101 may use one or more services 150 to communicate with various systems and/or devices operating in computing environments 199 owned and operated by trading partners (TPs) of OU-A. These TPs of OU-A can be, but need not be, OUs as well.

Non-limiting examples of services 150 may include, but are not limited to, translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc. As a specific example, a document may be sent by OU-A from client system 119 (e.g., a custom application) to a computer belonging to a TP of OU-A utilizing Trading Grid Messaging Service (TGMS) 140 of Trading Grid 100. In this example, OU-A may be referred to as a sender and its TP may be referred to as a receiver.

A "document" in this context refers to the encoding of information in digital form for the purpose of exchanging the information with another party. The encoding of the document may also include metadata about its content, destination, operational parameters, permissions, etc. Examples of documents in this context can include electronic data interchange (EDI)-encoded formats, all of the traditional office formats (MICROSOFT® Word, EXCEL, POWERPOINT, etc.), computer-aided design and computer-aided manufacturing (CAD/CAM) files, multimedia content including video, and even content that could be provided by a device participating in an Internet of Things network. Skilled artisans appreciate that EDI is an electronic communication method that provides standards for exchanging data via any electronic means and that is defined as the computer-to-computer interchange of formatted messages by agreed message standards. EDI distinguishes mere electronic communication or data exchange in that in EDI, the usual processing of received messages is by computer only. By adhering to the same message standard, TPs, even in two different countries, can electronically exchange documents (e.g., purchase orders, invoices, acknowledgement, notices, etc.).

Figure 2:
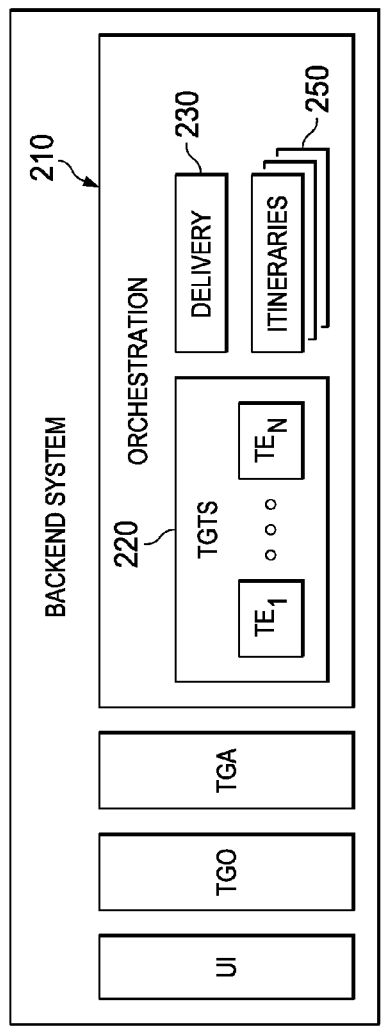
FIG. 2 depicts a diagrammatic representation of an example backend system embodying the intelligent document-centric orchestration control logic of the information exchange platform of FIG. 1 according to some embodiments.

In some embodiments, TGMS 140 may route the document sent by OU-A from client system 119 to an intelligent document-centric orchestration control logic ("orchestration") running on a backend system of system 110. An example of backend system 200 embodying orchestration 210 is illustrated in FIG. 2.

As illustrated, in addition to orchestration 210, backend system 200 may comprise various system components such as user interface (UI), TG Online application (TGO), and Trading Grid Administration (TGA). TGMS 140 may route the document sent by OU-A via the UI, the TGO, and the TGA to orchestration 210. TGO is the location for document-centric applications (e.g., active invoice, compliance, active communities, active orders, etc.), living within the TGO space. TGA is a mechanism to efficiently set up data flow tuples used by the underlying information exchange platform based on sender/receiver/document type. For example, as explained below, itineraries may be associated to data flow tuples using metadata (sender/receiver/document type) about the data flow. Orchestration 210 provides an ability to use an assembly language to define itineraries.

Delivery service 230, which is part of orchestration 210, may operate to process the document according to itinerary 250 associated with OU-A. Itinerary 250 may define a process model specific to a document type of the document. In some embodiments, an itinerary can be an XML document that describes a processing model for a particular send/receiver/document type and may include one or more processes. For example, itinerary 250 may include a process for translating the document using one or more translation engines (TE$_1$ ... TE$_N$) of Trading Grid Translation Services (TGTS) 220. TGTS 220 represents an example of an orchestrated service that can live in an itinerary—any orchestrated service can "live" in an itinerary as a process. As further explained below with reference to FIGS. 3A-3E, itineraries are associated with specific types of documents and some can be joined or otherwise linked by a common document-centric pattern.

Figure 3A:
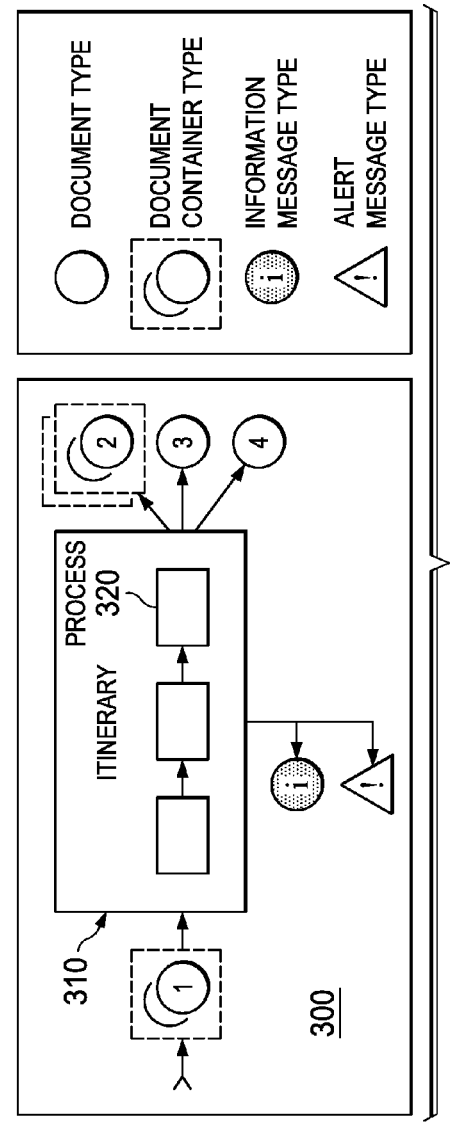
FIG. 3A depicts a diagrammatic representation of an example data flow for processing a document received from a sender according to some embodiments.

FIG. 3A depicts a diagrammatic representation of example sender data flow 300 for processing a document received from a sender. The Trading Grid has a lot of information about the document types that are processed through its runtime. The aforementioned document-centric approach can be realized utility this metadata. For example, when a new OU registers with the Trading Grid, an itinerary can be programmed and/or configured to receive from the new OU a document container of a particular type and generate (e.g., translate) the received document into a canonical format. A document container (e.g., an EDI container) can represent an envelope containing any number of documents coming from one sender and going to one receiver, at a single location. Internally, once the receiver gets the document container, they can route information to different divisions within their network.

When an OU can act as a sender or a receiver. When a particular OU is to receive a document from the Trading Grid, an itinerary can take the document in the canonical format (which is an internal representation utilized by the modules/components of the Trading Grid) and generate the document in a format that is acceptable by the particular OU's system.

In the example of FIG. 3A, sender data flow 300 represents a data flow for processing a document received from a sender computer associated with a registered OU (e.g., OU-A of FIG. 1). Based on a document container of a particular type (1), a delivery service (e.g., delivery service 230 of orchestration 210 of FIG. 2) performing sender data flow 300 may process the document according to itinerary 310, which is particularly configured to process document type (1). Itinerary 310 may include one or more processes 320. Processes 320 may employ managed services (e.g., services 150 of FIG. 1) of the Trading Grid to process the document and, as a result, various types of documents may be generated: container type (2) and document types (3) and (4). As discussed below, itinerary 310 may additionally produce informational messages of type (i) and alerts messages of type (!). Notice that information and alert messages are also document types, with specified semantics as for regular document types. In some embodiments, documents (2), (3), (4), (i), and (!) can all be canonical types. As explained below, this canonical representation advantageously enables reusability and facilitates the document-centric approach disclosed herein.

Figure 3B:
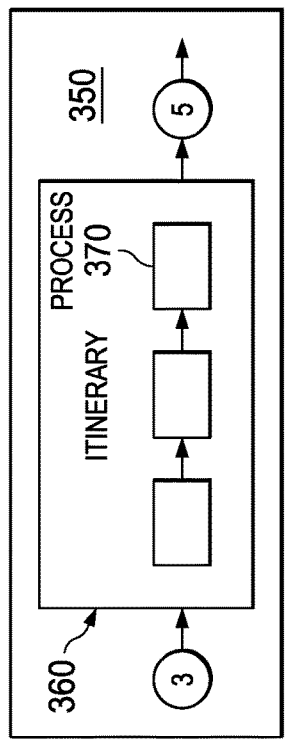
FIG. 3B depicts a diagrammatic representation of an example data flow for processing a document for a receiver according to some embodiments.

FIG. 3B depicts a diagrammatic representation of example receiver data flow 350 for processing a document for a receiver according to some embodiments. In this case, the receiver is already a registered OU and receiver data flow 350 is already configured to receive documents of type (3). Thus, receiver data flow 350 may process a document of type (3) according to itinerary 360, which is particularly configured to process document type (3), and generate, via processes 370, another type of document (5) specific to a receiver computer associated with the receiver.

Figure 3C:
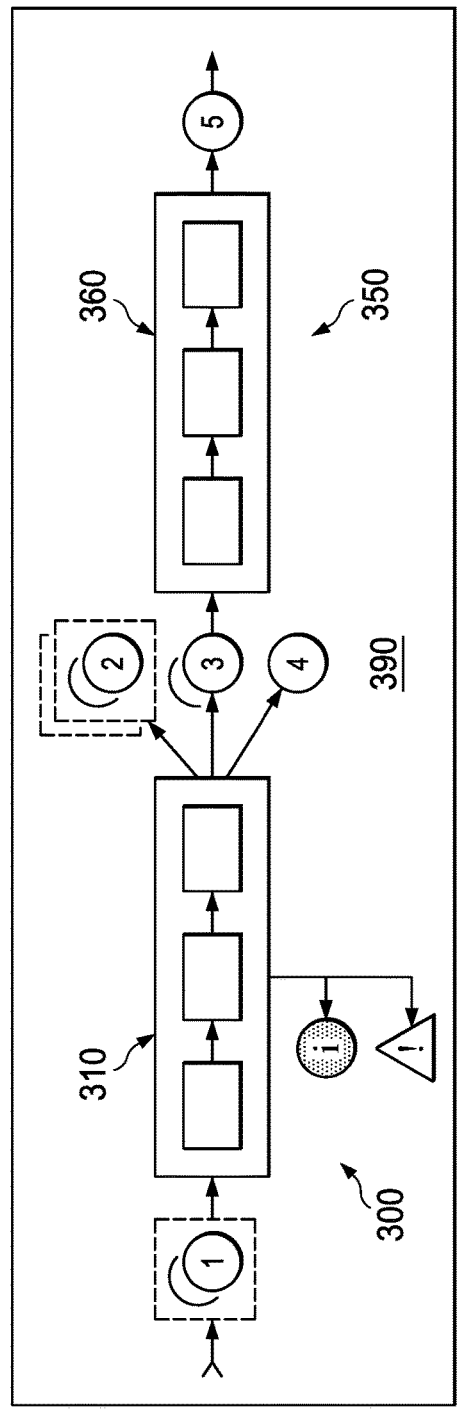
FIG. 3C depicts a diagrammatic representation of an example global data flow where two different itineraries are joined via a canonical representation of the information exchange platform according to some embodiments.

As FIG. 3C illustrates, itinerary 310 of sender data flow 300 and itinerary 360 of receiver data flow 350 can be joined, connected, or otherwise linked via document type (3), forming global data flow 390. In some embodiments, such a connection between a sender and a receiver can be specified via an orchestration authoring tool (e.g., TGA). Before describing global data flow 390 in detail, it is noted that informational and alert messages can use the same authoring and runtime facilities.

Figure 3D:
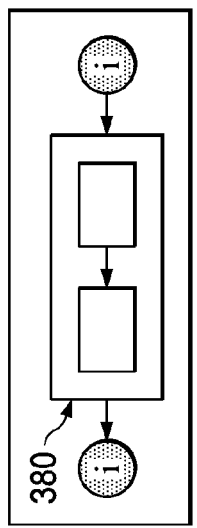
FIG. 3D depicts a diagrammatic representation of an example reverse itinerary for processing a canonical status message according to some embodiments.

For example, FIG. 3D depicts a diagrammatic representation of an example of reverse itinerary 380 for processing canonical status messages (i) for common information messages such as "File Received," "File Translated," "Invoice Signed," etc., according to some embodiments. These canonical status messages have clear semantics and well-known canonical payloads. As a non-limiting example, an OU may utilize a SAP (a company known for its Enterprise Resource Planning (ERP) and data management program products that allow entities to track customer and business interactions—SAP is an acronym for Systems, Applications and Products) system and need to receive Application Link Enabling (ALE) status messages. Reverse itinerary 380 (reverse in the sense that data flows back to the OU) can convert canonical status messages (e.g., those generated by itinerary 310 of sender data flow 300 of FIG. 3A) into SAP ALE status messages that the OU's SAP system can understand.

Figure 3E:
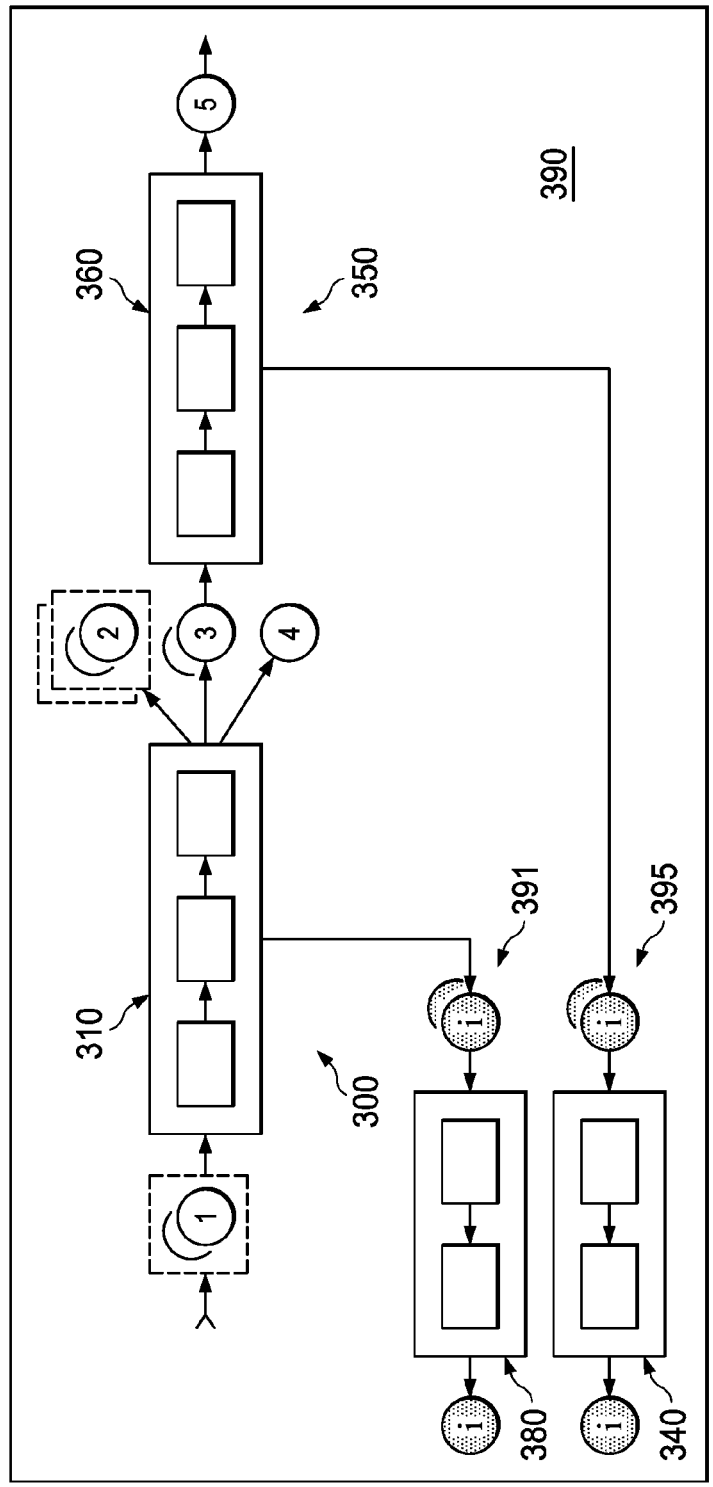
FIG. 3E depicts a diagrammatic representation of an example overall data flow in which itineraries associated with different operating units are joined across an entitlement boundary and in which reverse itineraries are utilized for communicating messages to the respective operating units according to some embodiments.

Accordingly, as illustrated in FIG. 3E, another example of global data flow 390 may include itinerary 310 of sender data flow 300 and itinerary 360 of receiver data flow 350 that are joined via document type (3), as well as message data flows 391 for processing canonical status messages from itinerary 310 of sender data flow 300 according to reverse itinerary 380 and message data flow 395 for processing canonical status messages from itinerary 360 of receiver data flow 350 according to reverse itinerary 340.

Note that many managed services may receive data from sources via ERP files. An ERP file may contain many documents in different types. Documents of the same type may be destined to be delivered to different partners. On a schedule or some trigger for submission, etc., the Trading Grid may take an ERP file and convert the ERP file into whatever available component parts in canonical representations. Additional work may be done at that time for the OU from which the ERP file is received. Such canonical representations can serve as an integration point to deliver to the particular OU's partners. For instance, a general itinerary can be set up to translate the canonical representation back into the EDI format for delivery to their partners that are used to getting documents via the EDI value-added network.

Skilled artisans appreciate that the sender and the receiver in the above example each can have their own entitlement boundary within which a document can be processed, understood, and/or stored. Conventionally, while exchanging a document between a sender and a receiver involves both parties, neither party has visibility over the entire lifecycle of the document transaction because they each only have access to the document within their respective entitlement boundary. Thus, from the perspective of the sender, "delivery" of the document refers to the termination of its entitlement boundary. It has no visibility beyond its entitlement boundary. This is illustrated in FIG. 4.

Figure 4:
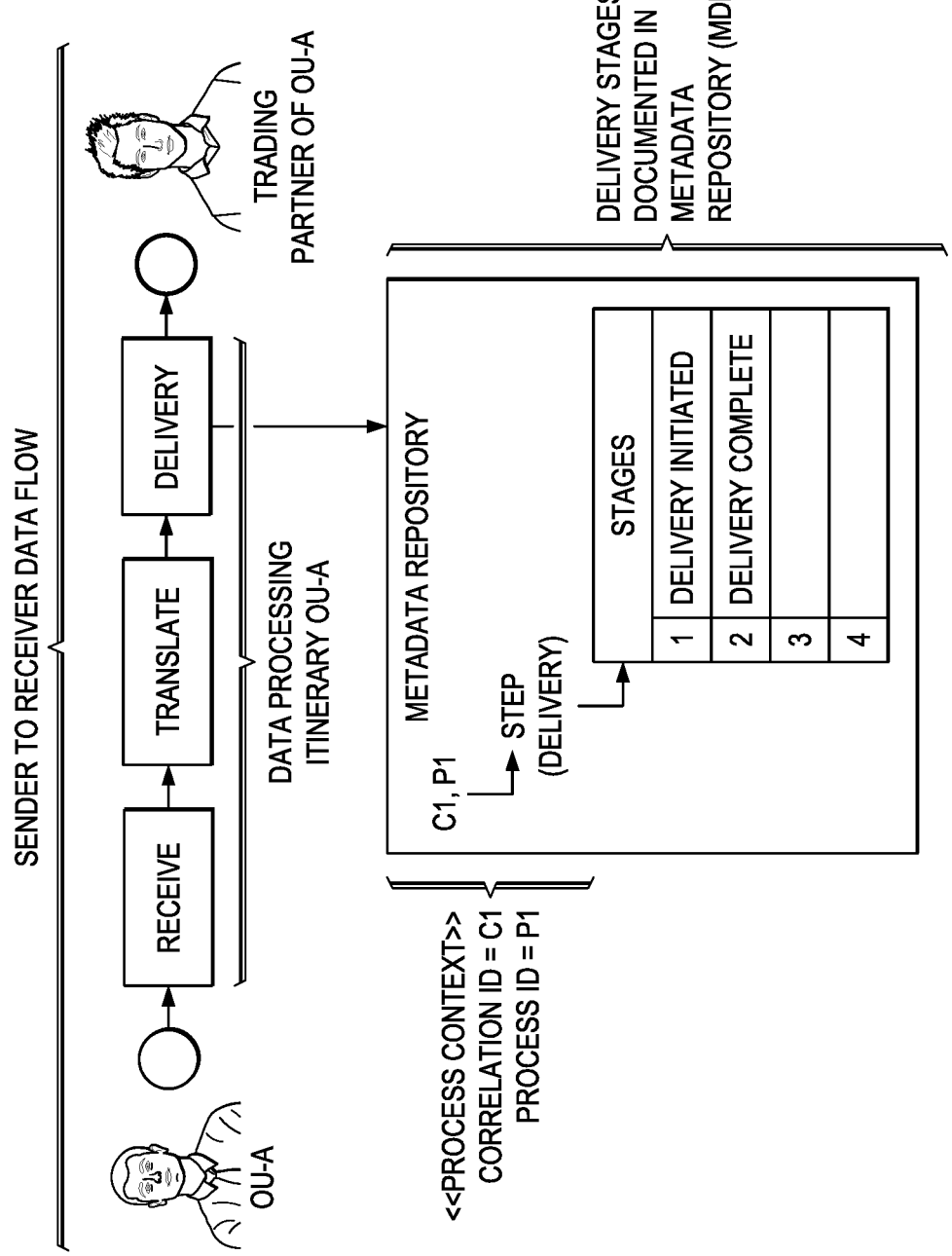
FIG. 4 depicts an example sender-to-receiver data flow according to some embodiments, the sender being an operating unit communicatively connected to the information exchange platform, the receiver representing a non-operating unit trading partner of the sender.

FIG. 4 depicts an example of a sender-to-receiver data flow according to some embodiments. In this example, the sender (OU-A) is communicatively connected to an information exchange platform (e.g., Trading Grid 100 of FIG. 1). From the perspective of OU-A, delivery is complete and terminates at the end of sender-to-receiver data flow. OU-A has no visibility of any processing done to the document beyond the end of the sender-to-receiver data flow.

Figure 5:
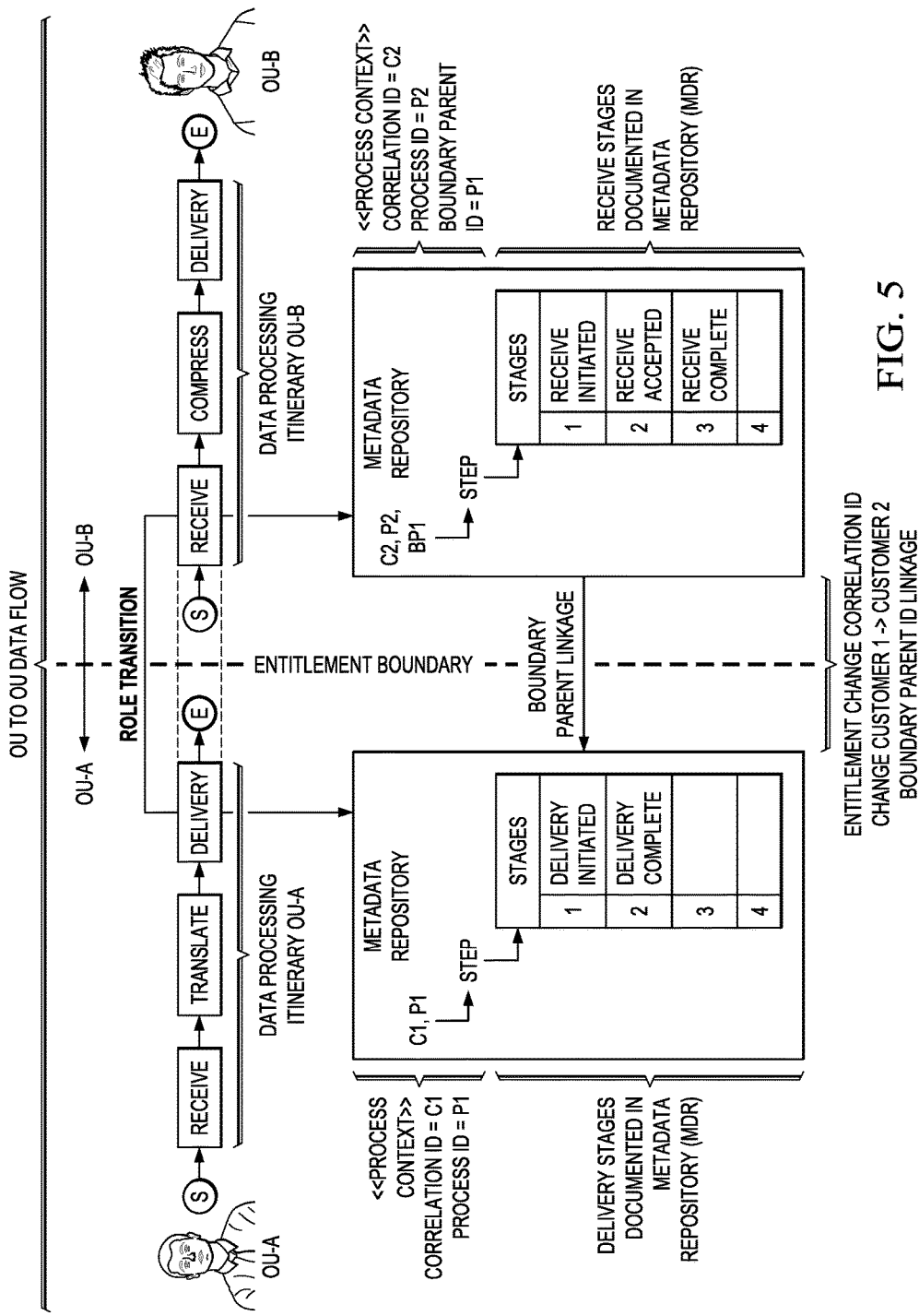
FIG. 5 depicts an example operating unit-to-operating unit data flow according to some embodiments.

FIG. 5 depicts an example operating unit-to-operating unit data flow according to some embodiments. As discussed above, itineraries are associated with specific types of documents (and hence document-centric). For instance, if a document is to be processed for validation (via a validation service), validation rules would be specific to the particular kind of that document (e.g., rules applicable to purchase orders would be different from rules applicable to a shipping note).

If a particular itinerary to a particular document type has certain characteristics (for any OU that requires that kind of processing model), then that itinerary would be useful for them as well. For instance, validation and all the visibilities associated therewith may allow an OU to understand the integrity of the data coming in and out of their enterprise network. Thus, in embodiments disclosed herein, itineraries are document-centric, each describing a processing model with particular characteristics and are not tied to any particular OUs.

In the Trading Grid, there are specific representations of the kinds of services that are either part of the itineraries or are major consumers of metadata that are very OU-specific. For instance, TGTS (e.g., TGTS 220 of FIG. 2) can convert (via a translation engine or a computerized "translator") an OU-specific format (or OU-domain-specific) to a canonical format or from a canonical format to a TP-specific (or TP-domain-specific) format, and vice versa. As a non-limiting example, such a conversion may include mapping metadata, converting a first metadata field with a first value to a second metadata field with a second value. Accordingly, the translator consumes a document and outputs a document in a different format using that metadata.

In this way, specific information related to specifics aspects of metadata of each OU (e.g., certain cross-reference information that may otherwise be missing) can be included in the document being processed through the Trading Grid. The Trading Grid allows OUs to administer what metadata to use and the Trading Grid ensures that the metadata are processed into the document as they are being translated. Certain services may have a real high usage of metadata. TGTS, validation engine, rules, etc. that consume metadata are examples of orchestrated services that can be linked via itineraries that have a direct document-centric association via an internal representation (referred to as a canonical format) of the Trading Grid.

In the example of FIG. 5, OU-A uses an itinerary that has an output of a particular document type in a canonical format and OU-B uses an itinerary that has an input of the same particular document type in the canonical format. If OU-A (e.g., a new customer of the Trading Grid) wants to trade with OU-B (and, thus, making OU-B a trading partner of OU-A), the delivery service can operate to join, connect, or otherwise link these itineraries. This linking operation can be straightforward—since the output from the itinerary of OU-A and the input to the itinerary of OU-B are both normalized and canonicalized, the canonical document becomes the join point where one data flow owned by OU-A transitions into another data flow owned by OU-B.

It should be noted that, this straightforward linking operation is possible because the OUs each have already been set up (by the Trading Grid) all the applicable rules and metadata related thereto. Thus, this straightforward linking operation essentially exploits the significant efficiency that can be derived from this pattern in converting from an OU-A-specific format to a canonical format of the Trading Grid to an OU-B-specific format.

As discussed above, when an OU registers with the Trading Grid, an itinerary is set up to process a document container of a certain type for the OU. The itinerary may generate another container that might be output to some place, may generate some canonical documents, and may generate some status messages that are coming out of the orchestrated services that can be used for other purposes.

In the example of FIG. 5, when OU-A registers with the Trading Grid, OU-A is assigned a correlation identifier (C1). When a document (e.g., a purpose order or PO) is received from OU-A, a process context is created and given a process identifier (P1) associated with C1. In this example, the process identifier can be a globally unique identifier that comprises, for instance, an alphanumeric string, which is exemplified in FIG. 5 as "P1."

The PO is processed (whatever processing is needed, for instance, decryption, inflating from a compressed format, validating the PO so that it is conformant to a standard, etc.) via orchestrated services. As illustrated in FIG. 5, all the processing done for OU-A at this point is independent to any processing done by the Trading Grid for OU-B.

Suppose OU-A now wants to trade with OU-B (e.g., sending the PO to OU-B). In this case, the processed PO is already in the Trading Grid's canonical format. Since OU-B has an itinerary that takes canonical POs as input, processing can continue seamlessly, essentially "auto-wire" the two itineraries together, and proceed with work (which, in this example, is triggered by a canonical PO) defined in OU-B's itinerary. The join point is the same canonical PO representation which is both an output (from the perspective of OU-A) and an input (from the perspective of OU-B).

In the Trading Grid, many itineraries associated with various OUs can be joined, connected, hooked, or otherwise linked together via canonical documents. An administrator of the Trading Grid may utilize administrative tools (e.g., TGA) to specify itineraries that can be joined or combined into a single data flow (e.g., by dragging a representation of an itinerary over a representation of a canonical document via a user interface (e.g., UI of system 200 shown in FIG. 2).

Referring to FIG. 5, in some embodiments, the Trading Grid may be configured to provide OU-A with full visibility of all the processing work performed for OU-A. For example, an authorized user associated with OU-A may access a user interface of the Trading Grid (e.g., generated by interface module 120 of system 110 of FIG. 1) and navigate to visibility tools of the user interface, view life cycles of documents being processed by the Trading Grid, and obtain (and/or receive) details about what's going (e.g., status messages). At the edge of this processing, from OU-A's perspective, the Trading Grid is transitioning a canonical document to another set of processing activities that are not actually owned by OU-A. So, from OU-A's perspective, this is a delivery.

However, that is not what is really happening in reality. As illustrated in FIG. 5, because OU-B has an itinerary that takes canonical POs as input, there are processing activities that are happening beyond the entitlement boundary of OU-A. In this case, these processing activities represent a receive process (service) for OU-B. From the visibility and visualization perspective, the delivery service performed for OU-A and the receiver service performed for OU-B concern different entitlement rights.

To understand the relationships of OU-A and OU-B without violating their entitlement boundaries, the Trading Grid employs a mechanism referred to as Process Context.

Process Context allows visualization of the entire process tree, and not just a process strand, that makes up the lifecycle of a document transaction from one sender to one receiver. As illustrated in FIG. 3A, itinerary 310 yields three different outputs, each one of which may have their own downstream processing associated therewith. Thus, even though work is done for one sender (e.g., OU-A), there could be multiple processes involved—it could be a single branch or a thousand branches.

In some embodiments, a process context is created when a content originating service is initiated. This can be triggered by edge activities (e.g., at a common gateway or the like which initially takes ownership of an incoming file). An example of a gateway component may be communicatively connected to the information exchange platform. The gateway component may receive the document from a sender computer. The gateway component may be logically associated with a receive service which can act as a content originating service that creates a process context that all downstream activities will use or augment until entitlement is changed.

At a minimum, the process context can have values for two fields—a correlation identifier (ID), which is the same for the entire process tree, and a process ID, which is unique to this process strand. When processing necessitates branching off and child processes are created, each child process would have their parent's process ID and their own unique process ID. The correlation ID never extends beyond the entitlement boundary such that, in a process tree, the nodes having the same correlation ID are all owned by the same entitlement entity.

In some embodiments, a boundary parent ID is a process context value and refers to the process ID of the parent process in play before a new correlation ID is created in the same process tree. For example, suppose a data flow represents a process tree where each child process of the process tree has a correlation identifier, a process identifier, and a unique child process identifier. In this case, the unique child process identifier is the boundary parent ID for a new, second process. Again, the correlation identifier does not extend beyond the entitlement boundary associated with the sender (i.e., it is not used by another process beyond the parent process). The boundary parent ID, in this case, is set up to correspond to a current unique process identifier in a current process context.

The creation of a new correlation ID indicates that the process tree has now crossed the entitlement boundary. The entire process tree, which links different data flows for different OUs can be visualized. This is possible because the Trading Grid functions as the intermediary that supports OUs on either side of the entitlement boundary (intermediary), even though the OUs themselves cannot visualize the activities outside of their entitlement boundary. This visibility has many (document-centric) applications. For example, an OU may want to know, for the purpose of their own tracking, when a document actually, physically arrives at its destination, not when the document transitions to their TP's itinerary. They need to be able to link these two together. Assuming the OU has the appropriate entitlement rights, the aforementioned visibility tools of the Trading Grid may provide the OU with the ability (functionality) to query and get a response to view what happens on their TP side via the correlation and entitlement association. For instance, the OU may provide a correlation ID and a process ID to a document-centric application, the document-centric application may, in turn, query the backend system embodying the orchestration component described above, the orchestration component may operate to determine whether a process strand associated with the process ID has a boundary parent ID (which is a globally unique key). If so, the orchestration component may take that boundary parent ID and search (e.g., via data store 160 of FIG. 1) for any correlation trees that might have this boundary parent ID in them. In this way, the OU is allowed to transition over its entitlement boundary and view the full scope of the lifecycle of that file, even though processing was done for different OUs. As discussed above, in general, the common practice is that an OU cannot visualize processing activities beyond its entitlement boundary. The orchestration component is operable to extend this visibility and visualization beyond entitlement boundaries and, instead, take a document-centric approach to document processing.

In some embodiments, joining of itineraries of different OUs is not done manually (e.g., by an administrative user). Rather, it is done automatically based on policy rules. A component referred to as the Context-Based Routing (CBR) component (which is a policies and rules environment) may take a sender/receiver/document type data flow tuple as input and return metadata about that tuple. As discussed above, a data flow tuple can be created when a document is received to represent a sender, receiver, and the document type associated with the document. The data flow tuple can be used to uniquely identify (resolve) the receiver policy rule.

One of the metadata attributes returned by the CBR component may be an itinerary association. At a process branch point (e.g., delivery), a determination can be made based on configuration and this metadata. For instance, based on the fact that an itinerary association is to be set up, the document (which at the delivery is already in the canonical format) is then provided to another translator (according to a different itinerary).

From OU-A's perspective, the last step on this itinerary is more than likely a delivery. One of the features of the delivery service of the orchestration component is that it knows these quasi-itinerary associations are possible (across entitlement boundaries). So, if the delivery service is given a sender/receiver/document type, one of the first things it does is to evaluate the sender/receiver/document type against the CBR policy rule set associated with OU-A and it knows that the work that it is doing now is for OU-A (because the file came in from OU-A, the sender). However, it goes further and determines whether there is a policy that is in play for this sender/receiver/document type where the owner of the policy is the OU-B, the receiver (i.e., the TP of OU-A. If there is, the delivery service of the orchestration component determines that this process entails crossing an entitlement boundary and proceeds to set up a boundary parent ID and establishes a relationship to the new itinerary of the TP and acts very much like a receive service for this new itinerary.

On the technical level, this delivery service performs many functions. Delivery can take many forms (e.g., a push operation over FTP, a deposit operation to leave something in a mailbox waiting for pickup by a TP, etc.). So, this delivery service has knowledge of what constitutes success or failure on the disposition level. It is a very intelligent orchestrated service. "Delivery" in this sense refers to an entitlement change (when at least one receiver policy rule is applicable to the document based on the document type of the document; otherwise, the document can be delivered without entitlement change because the delivery can be made under the original process context).

When the delivery service delivers something and it successfully acknowledges the disposition of success, from the sender's perspective, that constitutes the success of a delivery. Note that, delivery does not always necessarily have to represent the depositing of something inside of another party's domain (or network). From the control, visibility, and entitlement perspective, "delivery" can mean that this process strand has reached its conclusion. Within the bounds of that process patter, the delivery service determines (makes a conscious decision) that the delivery is done and a new receipt for another has begun for this other TP to which other CBR applicable to the document belongs.

Accordingly, in this disclosure, "delivery" may refer to the termination of an entitlement boundary and signals the start of a new entitlement boundary where the delivery service acts as a logical receive service for receiving data for this other TP and proceeds to perform a receive operation for the TP. This linking of itineraries across entitlement boundaries may occur more than once in the lifecycle of a document and may involve multiple OUs communicatively connected to the Trading Grid.

Figure 6:
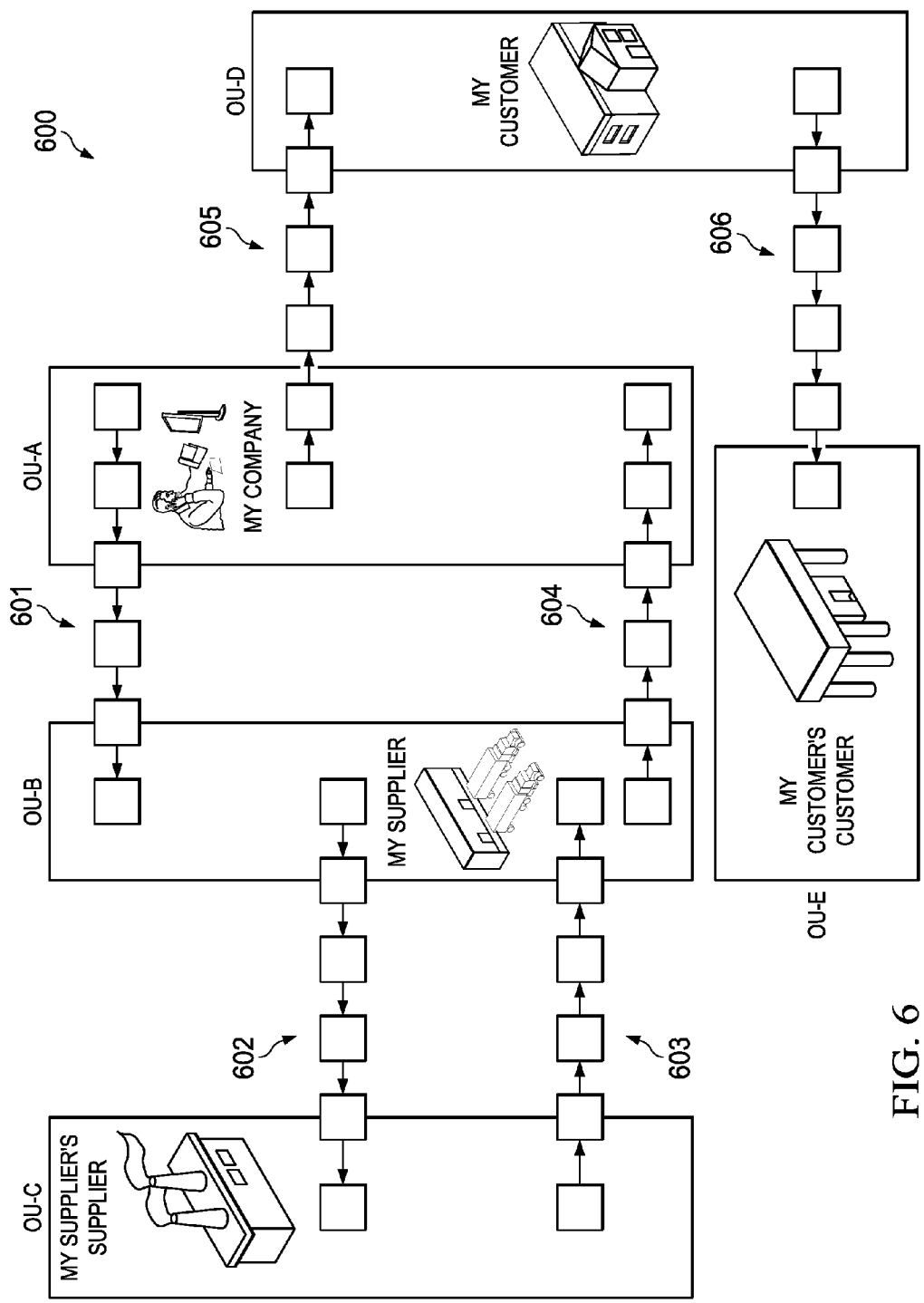
FIG. 6 depicts a diagrammatic representation of an example of a global document flow involving multiple operating units communicatively connected to the information exchange platform, each operating unit having its own entitlement boundary according to some embodiments.

FIG. 6 depicts a diagrammatic representation of an example of a global document flow involving multiple OUs, each having its own entitlement boundary. In this example, supply chain network 600 may include a plurality of operating units (OUs) including "My Company" (OU-A), "My Supplier" (OU-B), "My Supplier's Supplier" (OU-C), "My Customer" (OU-D), and "My Customer's Customer" (OU-E).

Notice that in FIG. 6, supply chain network 600 reflects a perspective of OU-A "My Company." That is, on the one hand, OU-A may have specific knowledge about OU-B and OU-D because OU-B and OU-D are TPs of OU-A. On the other hand, OU-A may know of OU-C through OU-B, a supplier of OU-A, but OU-A may not have specific knowledge about OU-C. Likewise, OU-A may know of OU-E through OU-D, a customer of OU-A, but OU-A may not have specific knowledge about OU-E. Therefore, the levels of knowledge that OU-A may have about each OU in supply chain network 100 may vary greatly from OU to OU.

As an example, suppose in building a product OU-A may need an item (or a part) of which OU-B is a supplier. Accordingly, OU-A may send an Order (a type of document supported by supply chain network 600) to OU-B (601) via the Trading Grid disclosed herein. OU-B, which is a TP of OU-A, may receive the Order from OU-A and work to fulfill the Order from OU-A. In doing so, OU-B may need one or more items from OU-C. Accordingly, OU-B may send an Order (which may or may not combine the Order from OU-A with any other Order from any of OU-B's own TPs) to OU-C (602). OU-C, in this case, is a TP of OU-B, but not a TP of OU-A. OU-C fulfills the Order from OU-B (603) which, in turn, fulfills the Order from OU-A (604). OU-A then completes and provides the product to its customer, OU-D (605). OU-D, which is a TP of OU-A, may use the product from OU-A to fulfill an Order from its own customer, OU-E (606). OU-E, in this case, is a TP of OU-D, but not a TP of OU-A. Skilled artisans appreciate that the orchestration component described above can orchestrate services needed to process data flow among these OUs and joining their respective itineraries as appropriate, automatically "wiring" processing activities providing full visibilities thereof across their respective entitlement boundaries.

Figure 7:
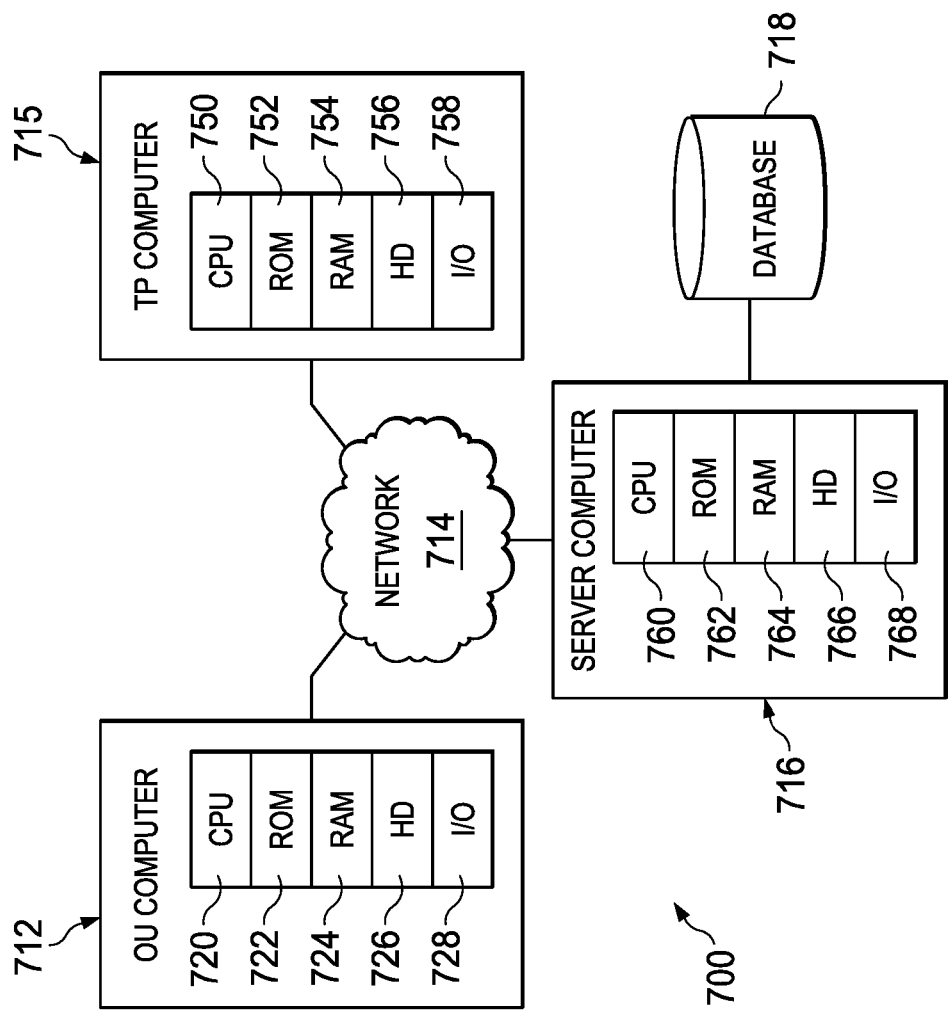
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to first enterprise computer 712, second enterprise computer 715, and Trading Grid computer 716. Trading Grid computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of first enterprise computer 712, second enterprise computer 715, and Trading Grid computer 716. However, with each of first enterprise computer 712, second enterprise computer 715, and Trading Grid computer 716, a plurality of computers (not shown) may be interconnected to each other over network 714. For example, a plurality of first enterprise computers 712 and a plurality of second enterprise computers 715 may be coupled to network 714. First enterprise computers 712 may include data processing systems for communicating with Trading Grid computer 716. Second enterprise computers 715 may include data processing systems for individuals whose jobs may require them to configure services used by first enterprise computers 712 in network computing environment 700.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. First enterprise computer 712 can include a desktop computer, a laptop computer, a personal digital assistant, a cellular phone, or nearly any device capable of communicating over a network. Second enterprise computer 715 may be similar to first enterprise computer 712 and can comprise CPU 750, ROM 752, RAM 754, HD 756, and I/O 758.

Likewise, Trading Grid computer 716 may include CPU 760, ROM 762, RAM 764, HD 766, and I/O 768. Trading Grid computer 716 may include one or more backend systems configured for providing a variety of services to first enterprise computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for document-centric orchestration through an information exchange platform, the method comprising:
    processing a document in a first process context according to a first itinerary associated with a sender, the first process context having a first correlation identifier and a process identifier, the first itinerary representing a first data flow having a first entitlement boundary associated with the sender, wherein the first data flow represents a process tree where each child process of the process tree has the first correlation identifier, the process identifier, and a unique child process identifier, wherein the correlation identifier does not extend beyond the first entitlement boundary associated with the sender, the processing performed by a delivery service of the information exchange platform, the information exchange platform comprising at least one server machine operating in a network environment, the document received from a sender computer for delivery to a receiver computer, the sender computer and the receiver computer external to the network environment and communicatively connected to the information exchange platform, the processing according to the first itinerary associated with the sender comprising:
        evaluating a document type of the document to determine a policy rule set associated with the sender;
        applying the policy rule set associated with the sender;
        translating the document from a sender format to a canonical representation; and
        marking the first data flow as complete with respect to delivery of the document;
    determining, by the delivery service of the information exchange platform based on the document type of the document, whether any receiver policy rule is applicable to the document;
    responsive to at least one receiver policy rule being applicable to the document based on the document type of the document, the delivery service of the information exchange platform performing:
        determining a second itinerary in view of the at least one receiver policy rule, the second itinerary representing a second data flow having a second entitlement boundary associated with a receiver;
        automatically transitioning to act as a receive service for the second entitlement boundary associated with the receiver;
        setting up a boundary parent identifier to link the first itinerary associated with the sender and the second itinerary associated with the receiver;
        establishing a linkage with the second itinerary;
        processing, acting as the receiver service, the canonical representation from the first data flow as an input to the second itinerary in a second process context according to the second itinerary associated with the receiver, the second process context having a second correlation identifier and the process identifier, the processing according to the second itinerary associated with the receiver comprising:
            applying the at least one receiver policy rule associated with the receiver;
            translating the input from the canonical representation to a receiver format; and
            marking the second data flow as complete with respect to receipt of the document.

2. The method according to claim 1, further comprising:
    receiving, by a gateway component communicatively connected to the information exchange platform, the document from the sender computer; and
    creating the first process context.

3. The method according to claim 1, wherein the evaluating utilizes a data flow tuple representing the sender, the receiver, and the document type of the document.

4. The method according to claim 1, wherein the unique child process identifier is extendible, as the boundary parent identifier, beyond the first entitlement boundary associated with the sender.

5. The method according to claim 1, wherein the first itinerary associated with the sender comprises an Extensible Markup Language (XML) document that describes a processing model specific to the document type of the document.

6. The method according to claim 1, wherein responsive to at least one receiver policy rule being applicable to the document based on the document type of the document, delivery of the document represents an entitlement change from the sender to the receiver.

7. The method according to claim 1, wherein responsive to no receiver policy rule being found or applicable to the document based on the document type of the document, the delivery service of the information exchange platform delivers the document to the receiver under the first process context.

8. A system for document-centric orchestration, the system comprising:

at least one server machine operating in a network environment, the at least one server machine having at least one processor and at least one non-transitory computer readable medium storing instructions translatable by the at least one processor for implementing a delivery service operable to perform:

processing a document in a first process context according to a first itinerary associated with a sender, the first process context having a first correlation identifier and a process identifier, the first itinerary representing a first data flow having a first entitlement boundary associated with the sender, wherein the first data flow represents a process tree where each child process of the process tree has the first correlation identifier, the process identifier, and a unique child process identifier, wherein the correlation identifier does not extend beyond the first entitlement boundary associated with the sender, the document received from a sender computer for delivery to a receiver computer, the sender computer and the receiver computer external to the network environment and communicatively connected to the information exchange platform, the processing according to the first itinerary associated with the sender comprising:

evaluating a document type of the document to determine a policy rule set associated with the sender;

applying the policy rule set associated with the sender;

translating the document from a sender format to a canonical representation; and marking the first data flow as complete with respect to delivery of the document;

determining, by the delivery service based on the document type of the document, whether any receiver policy rule is applicable to the document;

responsive to at least one receiver policy rule being applicable to the document based on the document type of the document, the delivery service further performing:

determining a second itinerary in view of the at least one receiver policy rule, the second itinerary representing a second data flow having a second entitlement boundary associated with a receiver;

automatically transitioning to act as a receive service for the second entitlement boundary associated with the receiver;

setting up a boundary parent identifier to link the first itinerary associated with the sender and the second itinerary associated with the receiver;

establishing a linkage with the second itinerary;

processing, acting as the receiver service, the canonical representation from the first data flow as an input to the second itinerary in a second process context according to the second itinerary associated with the receiver, the second process context having a second correlation identifier and the process identifier, the processing according to the second itinerary associated with the receiver comprising:

applying the at least one receiver policy rule associated with the receiver;

translating the input from the canonical representation to a receiver format; and marking the second data flow as complete with respect to receipt of the document.

9. The system of claim 8, wherein the evaluating utilizes a data flow tuple representing the sender, the receiver, and the document type of the document.

10. The system of claim 8, wherein the unique child process identifier is extendible, as the boundary parent identifier, beyond the first entitlement boundary associated with the sender.

11. The system of claim 8, wherein the first itinerary associated with the sender comprises an Extensible Markup Language (XML) document that describes a processing model specific to the document type of the document.

12. The system of claim 8, wherein responsive to at least one receiver policy rule being applicable to the document based on the document type of the document, delivery of the document represents an entitlement change from the sender to the receiver and wherein responsive to no receiver policy rule being found or applicable to the document based on the document type of the document, the delivery service of the information exchange platform delivers the document to the receiver under the first process context.

13. A computer program product for document-centric orchestration, the computer program product comprising at least one non-transitory computer readable medium storing instructions translatable by at least one processor for implementing a delivery service operable to perform, in a network environment:

processing a document in a first process context according to a first itinerary associated with a sender, the first process context having a first correlation identifier and a process identifier, the first itinerary representing a first data flow having a first entitlement boundary associated with the sender, wherein the first data flow represents a process tree where each child process of the process tree has the first correlation identifier, the process identifier, and a unique child process identifier, wherein the correlation identifier does not extend beyond the first entitlement boundary associated with the sender, the document received from a sender computer for delivery to a receiver computer, the sender computer and the receiver computer external to the network environment and communicatively connected to the information exchange platform, the processing according to the first itinerary associated with the sender comprising:

evaluating a document type of the document to determine a policy rule set associated with the sender;

applying the policy rule set associated with the sender;

translating the document from a sender format to a canonical representation; and marking the first data flow as complete with respect to delivery of the document;

determining, by the delivery service based on the document type of the document, whether any receiver policy rule is applicable to the document;

responsive to at least one receiver policy rule being applicable to the document based on the document type of the document, the delivery service further performing:
  determining a second itinerary in view of the at least one receiver policy rule, the second itinerary representing a second data flow having a second entitlement boundary associated with a receiver;
  automatically transitioning to act as a receive service for the second entitlement boundary associated with the receiver;
  setting up a boundary parent identifier to link the first itinerary associated with the sender and the second itinerary associated with the receiver;
  establishing a linkage with the second itinerary;
  processing, acting as the receiver service, the canonical representation from the first data flow as an input to the second itinerary in a second process context according to the second itinerary associated with the receiver, the second process context having a second correlation identifier and the process identifier, the processing according to the second itinerary associated with the receiver comprising:
    applying the at least one receiver policy rule associated with the receiver;
    translating the input from the canonical representation to a receiver format; and
    marking the second data flow as complete with respect to receipt of the document.

14. The computer program product of claim 13, wherein the evaluating utilizes a data flow tuple representing the sender, the receiver, and the document type of the document.

15. The computer program product of claim 13, wherein the unique child process identifier is extendible, as the boundary parent identifier, beyond the first entitlement boundary associated with the sender.

16. The computer program product of claim 13, wherein the first itinerary associated with the sender comprises an Extensible Markup Language (XML) document that describes a processing model specific to the document type of the document.

17. The computer program product of claim 13, wherein responsive to at least one receiver policy rule being applicable to the document based on the document type of the document, delivery of the document represents an entitlement change from the sender to the receiver and wherein responsive to no receiver policy rule being found or applicable to the document based on the document type of the document, the delivery service of the information exchange platform delivers the document to the receiver under the first process context.

* * * * *